United States Patent [19]

Halfmann

[11] Patent Number: 5,042,587
[45] Date of Patent: Aug. 27, 1991

[54] TOOL BAR WITH QUICK RELEASE TOOL LOCK

[75] Inventor: Craig P. Halfmann, Stephen, Minn.

[73] Assignee: H & S Manufacturing, Inc., Stephen, Minn.

[21] Appl. No.: 493,205

[22] Filed: Mar. 14, 1990

[51] Int. Cl.$^5$ ............................................. A01B 71/02
[52] U.S. Cl. ..................... 172/254; 172/481; 172/626; 172/640; 172/662
[58] Field of Search ............... 172/133, 136, 140, 245, 172/254, 249, 364, 481, 624, 626, 627, 634, 639, 640, 662, 675, 683, 739, 749, 776; 111/20, 52, 53

[56] References Cited

U.S. PATENT DOCUMENTS

| | | | |
|---|---|---|---|
| 520,002 | 5/1894 | Kirlin | 172/627 X |
| 849,956 | 4/1907 | Young | 172/739 X |
| 1,615,679 | 1/1927 | Bruning | 172/739 X |
| 2,725,807 | 12/1955 | Sibert | 172/739 X |
| 3,131,775 | 5/1964 | Long | 172/640 |
| 3,186,497 | 6/1965 | Forbes | 172/662 X |
| 3,351,181 | 11/1987 | Allen et al. | 198/215 |
| 3,480,086 | 11/1969 | Groenke | 172/739 X |
| 3,642,333 | 2/1972 | Eisenhardt et al. | 172/763 X |
| 3,675,725 | 7/1972 | Schultz | 172/245 |
| 3,680,648 | 8/1972 | Tonsfeldt | 172/159 |
| 3,741,137 | 6/1973 | Eisenhardt | 111/6 |
| 3,817,642 | 6/1974 | Eisenhardt | 403/385 |
| 3,825,358 | 7/1974 | Eisenhardt et al. | 403/188 |
| 3,970,012 | 7/1976 | Jones, Sr. | 111/6 |
| 3,998,275 | 12/1976 | Eisenhardt | 172/26 |
| 4,002,206 | 1/1977 | Eisenhardt | 172/90 |
| 4,019,755 | 4/1977 | Eisenhardt | 172/439 X |
| 4,030,551 | 6/1977 | Boetto et al. | 172/126 |
| 4,046,203 | 9/1977 | Ward | 172/456 |
| 4,063,597 | 12/1977 | Day | 172/126 |
| 4,078,504 | 3/1978 | Tye | 111/69 |
| 4,180,133 | 12/1979 | Collogan et al. | 172/26 |
| 4,184,551 | 1/1980 | Orthman | 172/26 |
| 4,213,505 | 7/1980 | Jolley | 172/510 |
| 4,231,433 | 11/1980 | Whitfield et al. | 172/662 |
| 4,291,524 | 9/1981 | Gates | 56/121.43 |
| 4,303,129 | 12/1981 | Mills | 172/530 |
| 4,318,444 | 3/1982 | Hake | 172/456 |
| 4,323,125 | 4/1982 | Pronovost | 172/59 |
| 4,331,204 | 3/1982 | White | 172/70 |
| 4,423,788 | 1/1974 | Robinson, Jr. | 172/427 |
| 4,449,590 | 5/1984 | Williamson | 172/126 |
| 4,506,610 | 3/1985 | Neal | 111/87 |
| 4,509,603 | 4/1985 | Adams | 172/427 |
| 4,522,267 | 6/1985 | Lewison | 172/28 |
| 4,553,607 | 11/1985 | Behn et al. | 172/156 |
| 4,585,073 | 4/1986 | Mayeda et al. | 172/158 |
| 4,660,653 | 4/1987 | Mayeda et al. | 172/552 |
| 4,681,335 | 7/1987 | Ledermann et al. | 172/328 X |
| 4,700,784 | 10/1987 | Wiebe et al. | 172/126 |
| 4,703,810 | 11/1987 | Meiners | 172/178 |
| 4,883,126 | 11/1989 | Leland | 172/26 |
| 4,942,927 | 7/1990 | Halfman | 171/58 |

FOREIGN PATENT DOCUMENTS 1302694  9/1961  France ........................ 172/662

OTHER PUBLICATIONS

Brochure by Wic, Inc., "Precision Cultivator".

Primary Examiner—Dennis L. Taylor
Assistant Examiner—Jeffrey L. Thompson
Attorney, Agent, or Firm—Vidas & Arrett

[57] ABSTRACT

A tool bar is provided with rotatable tool carrying sections having a quick release lock.

3 Claims, 2 Drawing Sheets

TOOL BAR WITH QUICK RELEASE TOOL LOCK

BACKGROUND OF THE INVENTION

1. Field Of The Invention

This invention relates to tool locks, and more particularly to a quick release lock used with tools mounted on a tool bar.

2. Description Of The Related Art

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

U.S. Pat. No. 3,675,725 is directed to a disc implement which uses hydraulics to raise and lower the disc. This reference is not considered anticipatory or suggestive of the claimed invention.

U.S. Pat. No. 3,680,648 is directed to a row crop cultivator with dual disc assemblies but does not describe or teach rotating them to a "up" or "down" position using a quick release tool lock. This reference is not considered anticipatory or suggestive of the claimed invention.

U.S. Pat. No. 4,423,788 is directed to a furrow forming apparatus which allows the furrow forming disks to be raised and lowered. This reference is not considered anticipatory or suggestive of the claimed invention.

U.S. Pat. No. 4,509,603 is directed to an adjustable cultivator tool holder which utilizes quick release pins to secure various tools. However, this disclosure does not teach using quick release pins to allow a tool to be rotated between an "up" and "down" position, but only to move the tools horizontally in or out. This reference is not considered anticipatory or suggestive of the claimed invention.

U.S. Pat. No. 4,522,267 is directed to a Shredder/Plow which uses hydraulics. This reference is not considered anticipatory or suggestive of the claimed invention.

U.S. Pat. No. 4,703,810 is directed to a disc and chisel plow implement which uses hydraulics to raise and lower an array of discs. This reference is not considered anticipatory or suggestive of the claimed invention.

U.S. Pat. No. 4,766,962 is directed to a spring biased furrow forming disk assembly. This reference is not considered anticipatory or suggestive of the claimed invention.

U.S. Pat. No. 4,883,126 is directed to a planter guide attachment which allows the discs to ride up over obstructions and return to the ground thereafter. This reference is not considered anticipatory or suggestive of the claimed invention.

None of these references provide an inexpensive arrangement to rotate a tool mounted on a tool bar to a "down" position for use, and an "up" position to disable use of that particular tool. Many of the disclosures teach elaborate and error prone hydraulic methods or other methods of raising and lowering discs. Applicant has provided a simple and quick device for rotating two discs to an "up" position to disable their use. This device could easily be installed on existing row crop cultivators.

SUMMARY OF THE INVENTION

Applicant's invention provides a tool bar made up of three sections. The middle section is fixedly mounted to a main beam. The other two sections carry tools, and are mounted on either side of the middle section. All three sections are hollow and carry a single axle. The two end sections are welded to the axle for rotation with the axle. The tools may be locked into an "up" or "down" position by means of the quick release tool locks which are mounted on either end of the middle section of tool bar. Each lock contains a locking pin which extends through a plate attached to the middle section, and locks into position in a second plate mounted to the tool carrying section. The plate mounted on the tool carrying section rotates with that section, and contains at least two locking pin receiving holes to lock the tool carrying section into an "up" or "down" position.

DESCRIPTION OF THE PREFERRED EMBODIMENTS

Figure 1:
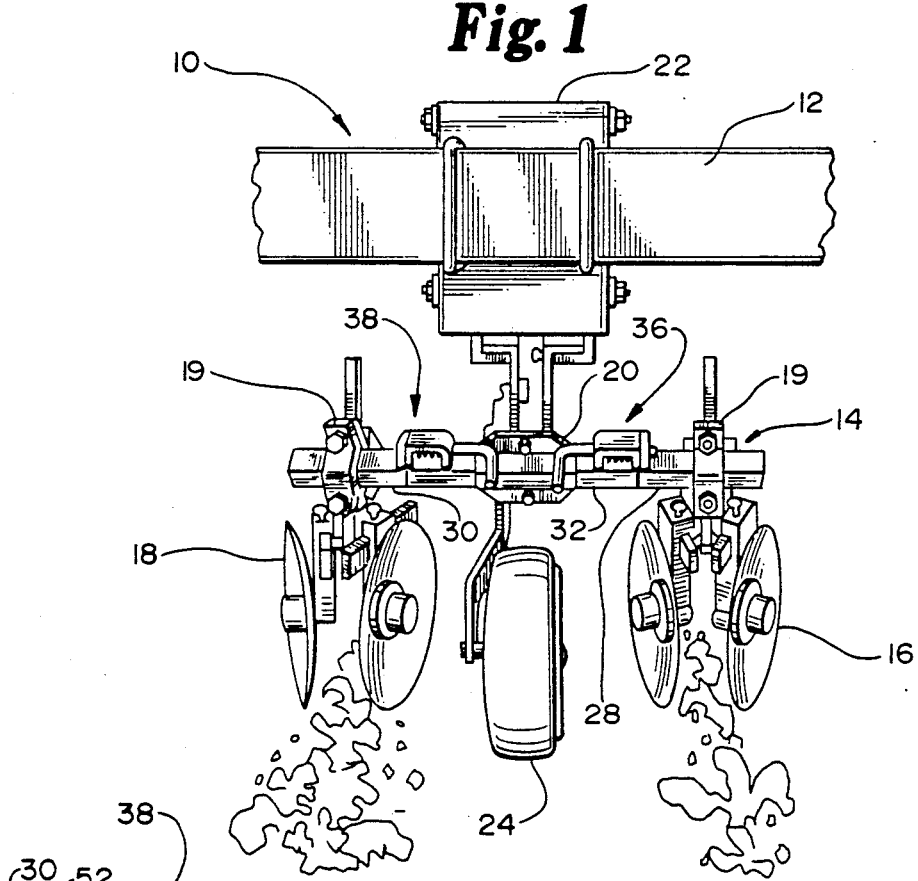
FIG. 1 is a front perspective view of the present invention.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

Referring now to FIG. 1, a portion of a row crop cultivator carrying the subject invention is shown generally at 10. Other equipment may make use of this invention; the cultivator is shown as exemplary. Row crop cultivators as shown and described in this application are generally old in the art. The invention is directed to a modified tool bar with a quick release tool lock assembly to easily allow rotating a tool, such as a dual disc assembly, into an up or down position. The cultivator 10 is comprised of a main beam 12 which carries sections of tool bar and/or wheels. FIG. 1 shows a tool bar shown generally at 14 with two dual disc assemblies 16 and 18 mounted on either end of the tool bar 14 using clamping straps 19. Tool bar 14 is fixedly attached to the main beam 12 using tool bar clamp 20 which is attached to hanger unit 22. Wheel 24 is also attached to hanger unit 22. Using a hanger unit attached to a main beam to support a tool bar and wheel assembly is generally old in the art.

Figure 2:
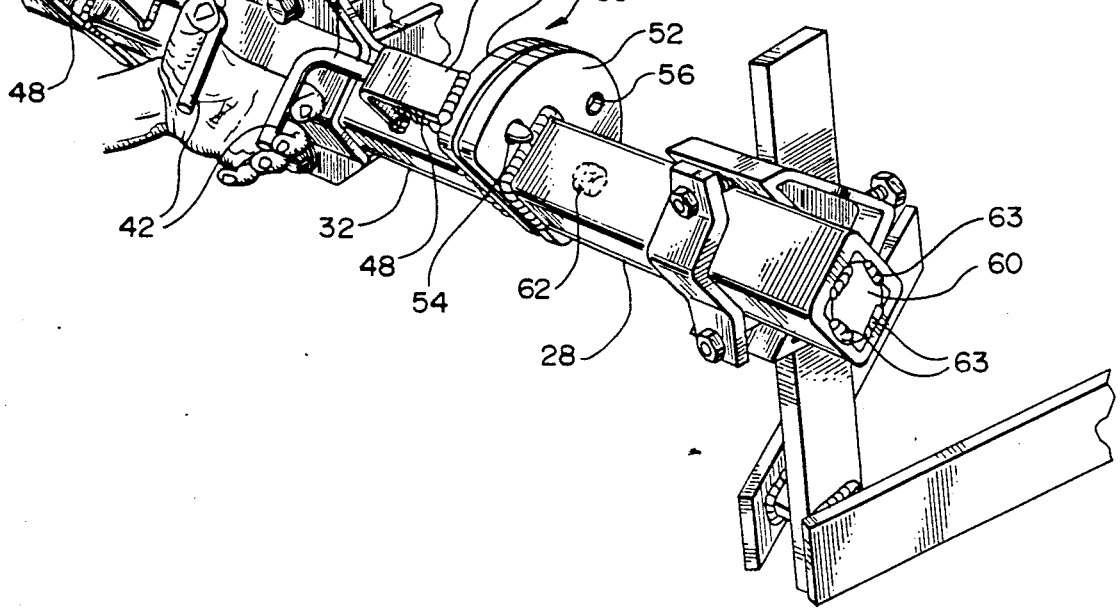
FIG. 2 is a fragmentary perspective view of FIG. 1 with parts omitted for clarity, showing the disc assembly in the down position.

As shown in FIGS. 1 and 2, tool bar 14 is comprised of three independent sections: the two end sections 28 and 30, and the middle section 32. The middle section 32 carries two quick release tool lock assemblies shown generally at 36 and 38. Quick release tool lock assemblies 36 and 38 are comprised of a locking pin 40, pin handle 42, a spring housing 44 which is welded to tool bar section 32 and to a first plate 46 which is also attached to tool bar section 32. The spring housing 44 contains a compression spring 48 which biases the locking pin 40 into a normally locked position in which pin 40 engages an aperture or the like in a second plate 52 carried by the tool bar section. Plate 46 contains a hole (shown as 50 in FIG. 3) through which the locking pin 40 extends, for example. Tool bar sections 28 and 30 each contain a second plate 52 which contains two holes 54 and 56 which cooperate with locking pin 40 to provide two different positions, an "up" and "down" for example, for tools 16 and 18. Plate 52 on each end section 28 and 30 is fixedly attached to that end section. FIG. 2 shows the invention with the discs 16 and 18 in the "down" position.

Tool bar 14 sections are made of hollow 2 inch by 2 inch square tubing in the preferred embodiment. An axle 60 is carried in the hollow portion of tool bar 14. In the preferred embodiment, the square tubing is welded to the axle 60 at each end section 28 and 30 of the tool bar 14. This is done using the weld spindle 62 on each end section 28 and 30, and welding the ends of the square tubing to the axle, shown at 63. The middle section 32 of the tool bar 14 is fitted with a grease fitting (not shown) which allows the middle section 32 to be filled with grease, to allow the axle to rotate inside the fixed section 32 of the tool bar. This arrangement allows the two square tubing end sections 28 and 30 of tool bar 14 to rotate with axle 60 with respect to the fixed middle section 32 of the tool bar.

In operation, the dual disc assemblies 16 and 18 are raised to the "up" position by pulling the locking pins 40 from the normal engaged position, i.e., out of holes 54 and into an unlocked or release position, thereby compressing compression spring 48. With the pin 40 pulled out of hole 54, one of the dual disc assemblies is manually lifted, causing end sections 28 and 30 to rotate with respect to the fixed middle portion of the tool bar 32. Any tools on these sections are "raised" by such movement. When the disc has been raised so that it is parallel to the ground, the pin 40 is pushed into its normal locking position in hole 56 in plate 52 by the compressive force of compression spring 48.

Figure 4:
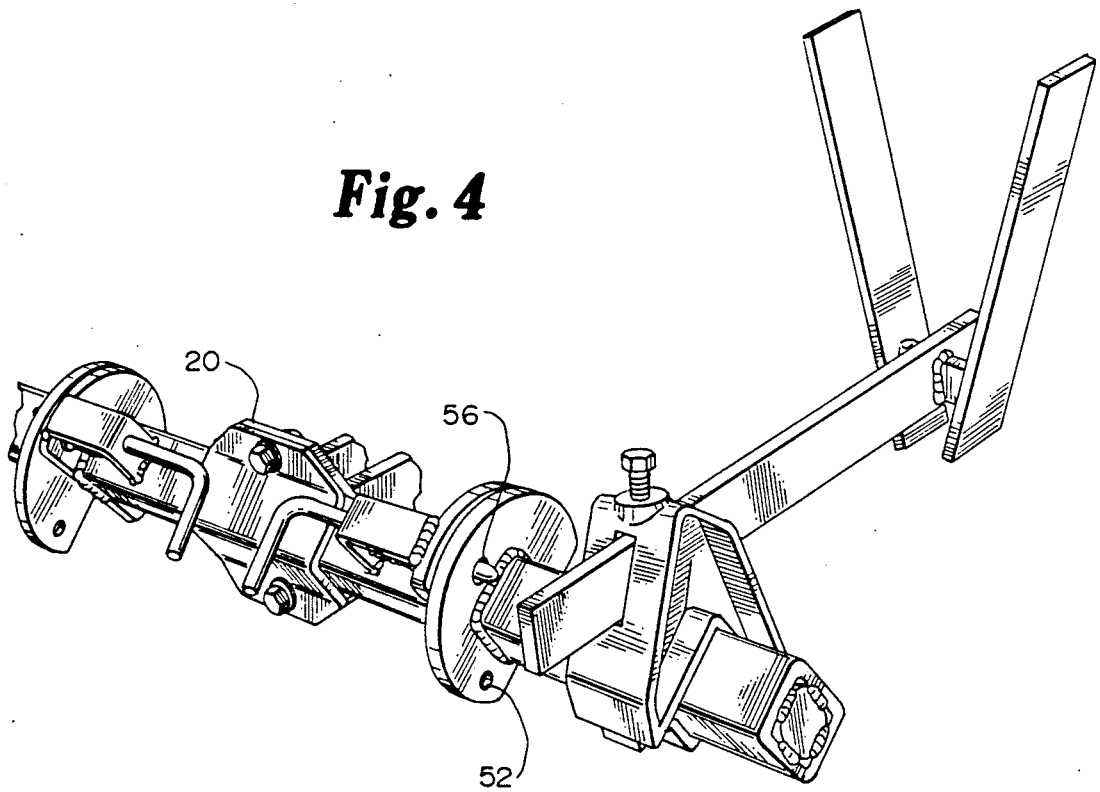
FIG. 4 is a view similar to FIG. 2 showing the disc assembly in the up position.

Referring to FIG. 4, the disc assemblies 16 and 18 may be placed in the "down" position by pulling pins 40 out of holes 56, thereby releasing the end sections 28 and 30 to rotate until stopped by the pin being pushed into its locked position in holes 52 by the compression spring 48. Gravity will cause the rotation of the end sections, and the dual discs may be manually assisted to the "down" position. To aid in this manual lifting and lowering of the dual disc assemblies, the pins 40 are long enough so that both pin handles 42 can both be easily gripped with one hand of the operator. A compression spring is chosen which allows for hand squeezing the two handles together, thereby quickly releasing both of the dual discs. The other arm of the operator will be aiding the dual discs to the "down" position by holding onto a single disc assembly. Additional locked positions may be provided as desired.

Figure 3:
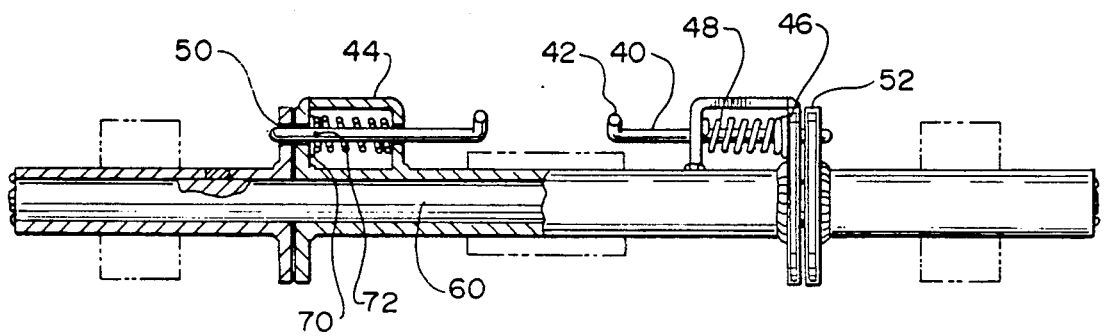
FIG. 3 is a simplified mechanical diagram of FIG. 2 with parts cut away.

Referring now to FIG. 3, the partial cross-sectional view shows that the end sections 28 and 30 are separate from the middle section 32 of the square tubing of tool bar 14. End sections 28 and 30 are terminated on the inside with plates 52, which rotate with respect to plates 46 on the ends of the fixed middle portion 32 of the tool bar. Locking pins 40 are held in place by washers 70 and pins 72.

Several modifications to the preferred embodiment shown and described are contemplated, and are intended to be included within the scope of this invention as claimed in the claims attached hereto. It is contemplated that only one quick release tool lock assembly would be necessary. While two locking assemblies (36 and 38) provide better support of the discs 16 and 18, only one would be absolutely necessary since both discs may be raised or lowered by raising or lowering either disc. This is due to both end sections 28 and 30 square tubing being welded to the axle 60 which runs continuously throughout the entire length of the tool bar 14. It is also contemplated that the raised or "up" position could be less than 90° or parallel to the ground as described in the preferred embodiment. The disc could be raised to any position above ground, it only being critical that the disc assembly does not touch the ground when in the "up" position. To that end it is also contemplated that additional holes other than 54 and 56 could be provided to allow for a plurality of additional positions intermediate to those provided by 54 and 56. Additionally, while this invention was described with relation to disc assemblies, it could be utilized for any type of tool which can be mounted on a tool bar. It is also contemplated that the manual operation of the locking pins 40 could be replaced with mechanical operation using a variety of methods.

This completes the description of the preferred and alternate embodiments of the invention. Those skilled in the art may recognize other equivalents to the specific embodiment described herein which equivalents are intended to be encompassed by the claims attached hereto.

What is claimed is:

1. A quick release tool lock for farm implement tool bars comprising:

a tool bar comprised of three sections, a fixed middle section and first and second tool carrying sections positioned to either side of the middle section, the three sections being substantially aligned along a longitudinal axis, the first and second tool carrying sections constructed and arranged for rotation with each other with respect to the fixed middle section around the longitudinal axis;

locking means constructed and arranged for cooperatively locking the tool carrying sections in a plurality of rotated positions with respect to the fixed section, the locking means comprising:

a manually operable locking pin;

a pin support attached to the fixed section of the tool bar, carrying the locking pin for longitudinal movement between a locking and release position;

a pin receiving means attached to a tool carrying section for rotation therewith and including at least two pin receiving apertures for selective registration and engagement with the locking pin when in the locked position.

2. A quick release tool lock for farm implement tool bars comprising:

a tool bar comprised of three sections, a fixed middle section and first and second tool carrying sections positioned to either side of the middle section, the three sections being substantially aligned along a longitudinal axis, the first and second tool carrying sections constructed and arranged for rotation with each other with respect to the fixed middle section around the longitudinal axis;

a pair of locking means, each being positioned near each end of the fixed middle portion of the tool bar, and being constructed and arranged for cooperatively locking each tool carrying section in a plurality of rotated positions with respect to the fixed section, each locking means comprising:
a manually operable locking pin;
a pin support attached to the fixed section of the tool bar, carrying the locking pin for longitudinal movement between a locking and release position;
a pin receiving means attached to a tool carrying section for rotation therewith and including at least two pin receiving apertures for selective registration and engagement with the locking pin when in the locked position.

3. A quick release tool lock for farm implement tool bars comprising:
a tool bar comprised of three sections of hollow square tubing, the tool bar surrounding an elongate axle which extends the entire length of the tool bar and defines a longitudinal axis, the three sections defining a fixed middle section and first and second tool carrying sections positioned to either side of the middle section, the three sections being aligned along the longitudinal axis, the first and second tool carrying sections being welded to the axle for rotation therewith with respect to the fixed middle section;
a pair of locking means, each being positioned near each end of the fixed middle portion of the tool bar, and being constructed and arranged for cooperatively locking each tool carrying section in "up" and "down" positions with respect to the fixed section, each locking means comprising:
a manually operable locking pin, the locking pin including a locking pin handle portion extending perpendicular to the locking pin;
a pin support attached to the fixed section of the tool bar, carrying the locking pin for longitudinal movement between a locking and release position;
a compression spring carried inside the pin support which biases the locking pin in the normally locked position;
a first plate attached to the end of the middle section and attached to the pin support and including an aperture through which the locking pin extends when in the locked position;
a second plate attached to a tool carrying section for rotation therewith and including two locking pin receiving apertures for selective registration and engagement with the locking pin when in the locked position;
a locking pin stop means comprising a stop pin extending through the locking pin and perpendicular thereto and constructed and arranged to abut a washer attached to the first plate;
the locking pins each extending a predetermined distance such that the locking pin handles may both be squeezed with one hand of an operator,
whereby an operator may release the locking pins by squeezing the locking pin handles and manually lift or lower a pair of tools attached to either end of the tool bar between "up" and "down" positions.

* * * * *